US008983486B2

(12) United States Patent
Manku

(10) Patent No.: US 8,983,486 B2
(45) Date of Patent: Mar. 17, 2015

(54) STATISTICAL WEIGHTING AND ADJUSTMENT OF STATE VARIABLES IN A RADIO

(71) Applicant: Research In Motion Limited, Waterloo (CA)

(72) Inventor: Tajinder Manku, Waterloo (CA)

(73) Assignee: BlackBerry Limited, Waterloo (CA)

(*) Notice: Subject to any disclaimer, the term of this patent is extended or adjusted under 35 U.S.C. 154(b) by 62 days.

(21) Appl. No.: 13/832,649

(22) Filed: Mar. 15, 2013

(65) Prior Publication Data

US 2014/0274098 A1  Sep. 18, 2014

(51) Int. Cl.
H04W 72/00 (2009.01)
H04W 24/02 (2009.01)
H04W 16/04 (2009.01)

(52) U.S. Cl.
CPC .............. *H04W 24/02* (2013.01); *H04W 16/04* (2013.01)
USPC ....................... 455/452.2; 455/423; 455/456.1

(58) Field of Classification Search
CPC ..................................................... H04W 16/04
USPC .................................. 455/423, 452.2, 456.1
See application file for complete search history.

(56) References Cited

U.S. PATENT DOCUMENTS

| | | | |
|---|---|---|---|
| 5,726,597 A | 3/1998 | Petty et al. | |
| 5,749,051 A | 5/1998 | Dent | |
| 6,242,963 B1 | 6/2001 | Su et al. | |
| 6,590,438 B1 | 7/2003 | Manku et al. | |
| 6,639,446 B2 | 10/2003 | Komurasaki et al. | |
| 6,859,085 B2 | 2/2005 | Watanabe et al. | |
| 6,898,252 B1 | 5/2005 | Yellin et al. | |
| 6,941,121 B2 | 9/2005 | Chen | |
| 7,006,447 B1 | 2/2006 | Vaisanen et al. | |
| 7,020,468 B2* | 3/2006 | Squibbs et al. | 455/445 |
| 7,164,901 B2 | 1/2007 | Zheng et al. | |
| 7,171,185 B2 | 1/2007 | Matsumoto et al. | |
| 7,203,476 B2 | 4/2007 | Ruelke et al. | |
| 7,218,163 B2 | 5/2007 | Hanke et al. | |
| 7,242,910 B2 | 7/2007 | Peterson, III et al. | |

(Continued)

OTHER PUBLICATIONS

IQ Imbalance Compensation in OFDMA based WiMAX Digital Receivers Wang Lilei; Xu Huimin, Computer Science and Information Technology, 2008. ICCSIT apos;08. International Conference on Volume , Issue , Aug. 29, 2008-Sep. 2, 2008 pp. 388-392.

(Continued)

*Primary Examiner* — Amancio Gonzalez
(74) *Attorney, Agent, or Firm* — Leveque Intellectual Property Law, P.C.

(57) ABSTRACT

A method involving receiving a real time communication signal at a radio receiver involves measuring at least one performance value associated with the radio receiver with an installed set of state variables; at a processor forming a part of the radio receiver: iteratively changing at least one of the state variables within a prescribed range in order to identify an improved value of the state variable that provides an improvement to the at least one performance value; storing the improved value of the state variable; applying a statistical weighting to the improved value and storing the statistical weighting; and adjusting the prescribed range of the state variable based upon the statistical weighting to provide a revised prescribed range that is statistically likely to contain state variable that provides improvement in the at least one performance value. This abstract is not to be considered limiting.

4 Claims, 6 Drawing Sheets

(56) References Cited

U.S. PATENT DOCUMENTS

| | | |
|---|---|---|
| 7,251,468 B2 | 7/2007 | Ruelke et al. |
| 7,259,569 B2 | 8/2007 | Kim |
| 7,292,836 B2 | 11/2007 | Endress et al. |
| 7,346,134 B2 | 3/2008 | Smith |
| 7,346,313 B2 | 3/2008 | Cafarella |
| 7,369,837 B2 | 5/2008 | Kim |
| 7,415,253 B2 | 8/2008 | Carter et al. |
| 7,421,260 B2 | 9/2008 | Darabi |
| 7,421,263 B2 | 9/2008 | Kim et al. |
| 7,440,742 B1 | 10/2008 | Tsai et al. |
| 7,447,490 B2 | 11/2008 | Kuo et al. |
| 7,450,918 B2 | 11/2008 | Park |
| 7,457,606 B2 | 11/2008 | Kim |
| 7,477,888 B2 | 1/2009 | Behzad |
| 7,496,340 B1 | 2/2009 | Chen et al. |
| 7,496,343 B2 | 2/2009 | Khorram |
| 7,509,112 B2 | 3/2009 | Fujii |
| 7,519,348 B2 | 4/2009 | Shah |
| 7,522,899 B1 | 4/2009 | He |
| 7,532,563 B1 | 5/2009 | Shirali et al. |
| 7,532,874 B2 | 5/2009 | Muhammad et al. |
| 7,542,100 B2 | 6/2009 | Yee et al. |
| 7,542,751 B2 | 6/2009 | Chiu et al. |
| 7,551,695 B2 * | 6/2009 | Speth .................... 375/341 |
| 7,554,380 B2 | 6/2009 | Embabi et al. |
| 7,567,611 B2 | 7/2009 | Chien |
| 7,570,965 B2 | 8/2009 | Rofougaran |
| 7,773,967 B2 | 8/2010 | Smith |
| 7,787,853 B2 | 8/2010 | Belot et al. |
| 7,869,777 B2 | 1/2011 | Darabi |
| 7,873,367 B2 * | 1/2011 | Malik et al. .............. 455/456.1 |
| 7,890,078 B2 | 2/2011 | Kluge et al. |
| 7,929,938 B2 | 4/2011 | Sellars et al. |
| 7,945,230 B2 | 5/2011 | Tillman |
| 7,949,313 B2 | 5/2011 | Ridgers et al. |
| 7,965,796 B2 | 6/2011 | Kutz et al. |
| 8,000,676 B2 | 8/2011 | Kim et al. |
| 8,010,077 B2 | 8/2011 | Ivonnet et al. |
| 8,045,943 B2 | 10/2011 | Kaczman et al. |
| 8,060,043 B2 | 11/2011 | Pratt et al. |
| 8,073,078 B2 | 12/2011 | Kaczman et al. |
| 8,107,368 B2 | 1/2012 | Connors et al. |
| 8,112,055 B2 | 2/2012 | Yang et al. |
| 8,112,059 B2 | 2/2012 | Beffa |
| 8,121,571 B2 | 2/2012 | Kushnir et al. |
| 8,149,902 B1 | 4/2012 | Mohindra |
| 8,149,955 B2 | 4/2012 | Tired |
| 8,150,350 B2 | 4/2012 | Pratt et al. |
| 8,150,360 B2 | 4/2012 | Ivonnet et al. |
| 8,290,031 B1 | 10/2012 | Murmann et al. |
| 2002/0197975 A1 | 12/2002 | Chen |
| 2003/0143967 A1 | 7/2003 | Ciccarelli et al. |
| 2004/0152435 A1 | 8/2004 | Pellat et al. |
| 2004/0259519 A1 | 12/2004 | Su |
| 2005/0110567 A1 | 5/2005 | Rabinovich et al. |
| 2005/0130619 A1 | 6/2005 | Hanke et al. |
| 2005/0143044 A1 | 6/2005 | Kim |
| 2005/0232377 A1 | 10/2005 | Kutz et al. |
| 2005/0239430 A1 | 10/2005 | Shah |
| 2006/0014515 A1 | 1/2006 | Ruelke et al. |
| 2006/0094361 A1 | 5/2006 | Darabi |
| 2007/0126491 A1 | 6/2007 | Woo et al. |
| 2007/0266350 A1 | 11/2007 | Fulga et al. |
| 2008/0116902 A1 | 5/2008 | Kim et al. |
| 2008/0165874 A1 | 7/2008 | Steele et al. |
| 2009/0004983 A1 | 1/2009 | Darabi |
| 2009/0068974 A1 | 3/2009 | Smith |
| 2009/0143031 A1 | 6/2009 | Shah |
| 2009/0202022 A1 | 8/2009 | Kaczman et al. |
| 2009/0239495 A1 | 9/2009 | Sellars et al. |
| 2009/0280767 A1 | 11/2009 | Tillman |
| 2009/0325529 A1 | 12/2009 | Yang et al. |
| 2010/0093298 A1 | 4/2010 | Pratt et al. |
| 2010/0120369 A1 | 5/2010 | Ko et al. |
| 2010/0167683 A1 | 7/2010 | McMullin et al. |
| 2011/0065412 A1 | 3/2011 | Beffa |
| 2011/0092178 A1 | 4/2011 | Wang |
| 2011/0128992 A1 | 6/2011 | Maeda et al. |
| 2011/0151792 A1 | 6/2011 | Kushnir et al. |
| 2011/0201296 A1 | 8/2011 | Kaczman et al. |
| 2011/0230157 A1 | 9/2011 | Zhou et al. |
| 2011/0299575 A1 | 12/2011 | Aoulad Ali et al. |
| 2012/0002770 A1 | 1/2012 | Morita et al. |
| 2012/0015616 A1 | 1/2012 | Pratt et al. |
| 2012/0088532 A1 | 4/2012 | Thomas et al. |
| 2012/0238232 A1 | 9/2012 | Murphy et al. |
| 2012/0252374 A1 | 10/2012 | Mattisson et al. |
| 2012/0300818 A1 | 11/2012 | Metreaud et al. |
| 2013/0029626 A1 | 1/2013 | Chen et al. |
| 2013/0157604 A1 | 6/2013 | Jantzl et al. |
| 2013/0231124 A1 | 9/2013 | Vrzic et al. |
| 2014/0162628 A1 * | 6/2014 | Bevelacqua et al. .......... 455/423 |

OTHER PUBLICATIONS

P. Rykaczewski, "Non-data-aided IQ imbalance compensation using measured receiver front-end signals", the 17th Annual IEEE Int. Sym on Personal, Indoor and Mobile Radio Com., 2006.

Extended European Search Report, EP13159410.3, Jul. 24, 2013.

* cited by examiner

US 8,983,486 B2

STATISTICAL WEIGHTING AND ADJUSTMENT OF STATE VARIABLES IN A RADIO

CROSS-REFERENCE TO RELATED APPLICATIONS

This application is related to U.S. patent applications: application Ser. No. 13/832,432; application Ser. No. 13/832,253; and application Ser. No. 13/832,313, each filed on even date herewith, which are incorporated herein in their entireties.

BACKGROUND

In radio frequency (RF) communication using portable devices, the RF environment can vary due to many factors including, for example, weather, temperature, location, surroundings, and aging components, to name a few. Also, a number of the parameters within the radio statistically vary from device to device. For example, in terms of the RF environment, some environments have more interference than other environments. In addition, some of the device parameters within a radio vary statistically from device to device with temperature, current consumption, voltage supply, or/and frequency channel to frequency channel.

However, most radios are designed to meet specifications in the worst possible conditions, but this may occur only a small percentage of the time. The remaining time, the radio may not be operating in an optimal manner.

BRIEF DESCRIPTION OF THE DRAWINGS

Example embodiments of the present disclosure will be described below with reference to the included drawings such that like reference numerals refer to like elements and in which.

DETAILED DESCRIPTION

Figure 1:
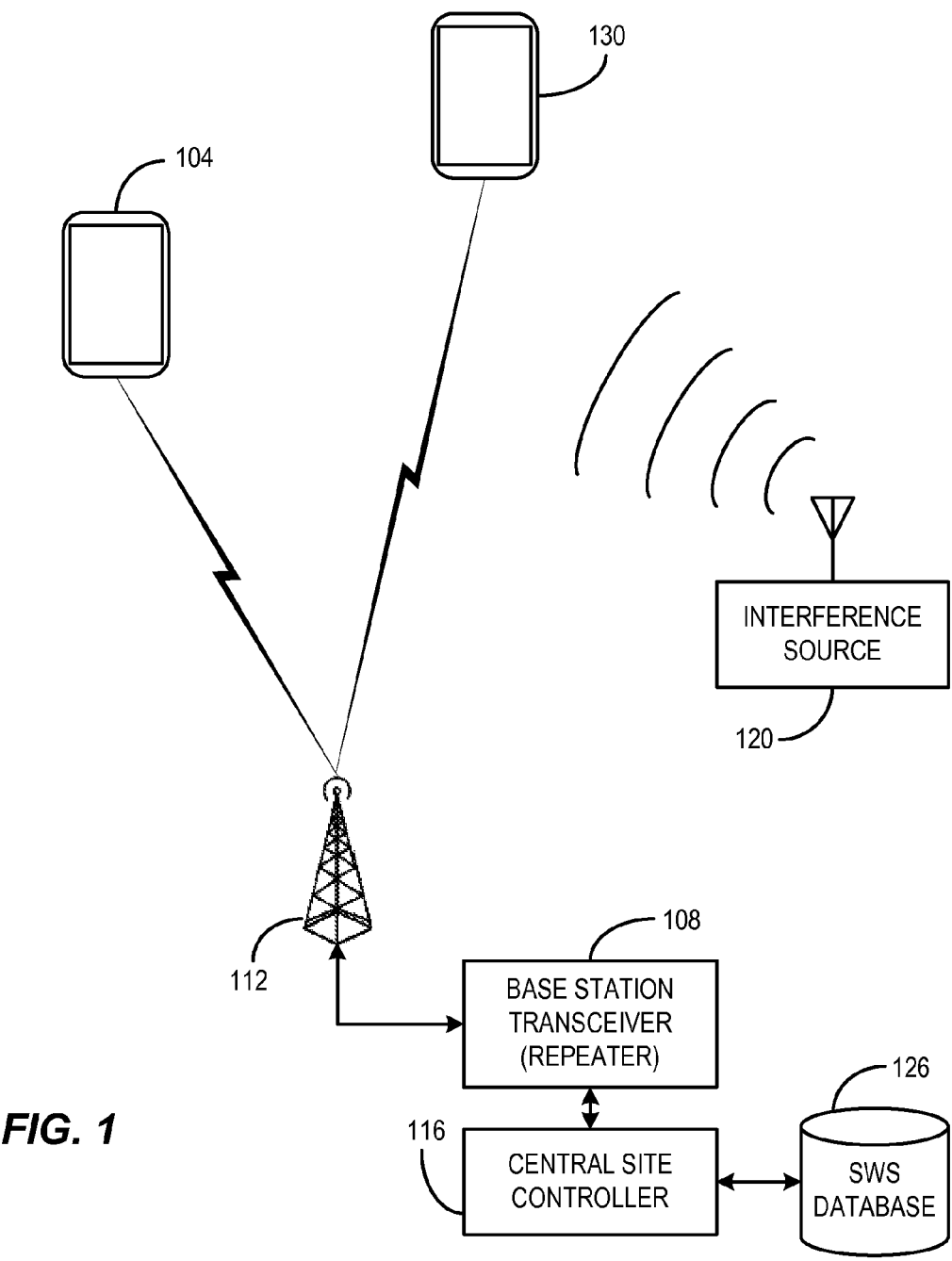
FIG. 1 is an illustration of a portion of an example wireless communication network.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The invention is not to be considered as limited to the scope of the embodiments described herein.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or "application" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system. The term "processor", "controller", "CPU", "Computer" and the like as used herein encompasses both hard programmed, special purpose, general purpose and programmable devices and may encompass a plurality of such devices or a single device in either a distributed or centralized configuration without limitation.

Reference throughout this document to "one embodiment", "certain embodiments", "an embodiment", "an example", "an implementation", "an example" or similar terms means that a particular feature, structure, or characteristic described in connection with the embodiment, example or implementation is included in at least one embodiment, example or implementation of the present invention. Thus, the appearances of such phrases or in various places throughout this specification are not necessarily all referring to the same embodiment, example or implementation. Furthermore, the particular features, structures, or characteristics may be combined in any suitable manner in one or more embodiments, examples or implementations without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Although the RF environment in which radios such as cellular telephones are used is statistically varying, the radio is designed for the worst possible conditions which only occurs less than 10% of the time. Also a number of the parameters within the radio statistically vary from device to device. For example, in terms of the RF environment, some environments have more interference than other environments. In addition, some of the device parameters within a radio vary statistically from device to device with temperature, current consumption, voltage supply, or/and frequency channel to frequency channel. This discussion relates to statistically weighting the states (or settings) within the radio or physical layer to enhance either: talk time and standby time or quality of service to the user. By way of example, IQ imbalance correction and second order distortion (IIP2) enhancement can be adjusted while the radio is in use in its current operational environment in order to optimize or improve performance of some aspect of the radio's operation.

For purposes of this document, any variable that affects the performance of the radio is considered to be a state variable. State variables should generally be bounded. Some state variables may only take on one valid value. Some illustrative examples of possible state variables include, but are not limited to: the location of the IF frequency, IQ gain and phase, Linearity (i.e. IIP2, IIP3, and compression), "Q" and centre frequency of RF filter, RF matching, current into circuit elements (e.g. voltage controlled oscillator(s)), Bandwidth/order of analog filters, mixer bias, amplifier gain, DC offset, supply voltage to circuit elements (e.g. the low noise amplifier(s)), etc.

The weighting of a state is based on the level of a suitable measure of radio performance that a particular state produces. The level of performance may include a measure of the quality of the signal. For example, performance could be measured as: Signal to Noise (SNR), Bit Error Rate (BER), a measure of interference, etc. Additionally, the level of performance could be related to a level of power consumption which affects battery life or some combination of performance parameters. In accord with the present discussion, the radio uses normal real time incoming communication signals or parts thereof to supply an input. A resulting performance parameter of the radio receiver is measured and a state variable optimized in some manner, in contrast to use of artificially generated signals in a factory setting.

Some states within a radio are set during power up or in manufacturing by introducing a test signal and measuring some aspect of the radio's performance when using that state. However, in such case the state has a probability of 100%. That is, that state is used 100% of the time for that device or that power up cycle.

In some circumstances, the state information relating to a particular location can be sent back to a central controller to help other devices in a local network or geographic area. If the statistically weighted states (SWS) of a device are locally known at a particular position, their SWS data could be used to help other devices within that known area. However, those states should usually only be a function of the environment (for example interference). For example, if a first radio sends its SWS data to a central location or other network repository, this central location can push applicable SWS data to devices that are geographically close using any suitable push technology. It is noted that not all SWS data can be applied to other radios (e.g., state variables that relate to correction for component aging, but not related to the radio environment, per se.).

There may also be cases where a new state variable is determined. If this happens, this state variable along with the measure of performance can be added as part of the radio or baseband via a software or firmware "patch" or "application".

Therefore, in accordance with certain aspects of the disclosure there is provide a method involving receiving a real time communication signal at a radio receiver; measuring at least one performance value associated with the radio receiver with an installed set of state variables; at a processor forming a part of the radio receiver: iteratively changing at least one of the state variables within a prescribed range in order to identify an improved value of the at least one state variable that provides an improvement to the at least one performance value; storing the improved value of the at least one state variable; applying a statistical weighting to the improved value and storing the statistical weighting; and adjusting the prescribed range of the at least one state variable based upon the statistical weighting to provide a revised prescribed range that is statistically likely to contain at least one state variable that provides improvement in the at least one performance value.

In certain implementations, the method further involves sending the improved value to a base station. In certain implementations, the base station pushes the improved value of the at least one state variable to a different radio receiver. In certain implementations, the method further involves storing environment data that characterizes the radio environment along with the improved value of the at least one state variable; sending the improved value and the environment data that characterizes the environment of the radio to a base station; and at the base station pushing the improved value of the at least one state variable to a different radio receiver that is within the environment of the radio. In certain implementations, the environment data comprises location data and the environment comprises a geographic area. In certain implementations, applying the statistical weighting comprises incrementing a value associated with the improved value of the at least one state variable. In certain implementations, the method further involves prior to the receiving, powering up the radio; and on powering up the radio, the processor initially installs the installed set of state variables having the highest statistical probability of providing the best performance according to the stored statistical weighting.

In another embodiment, a method involves powering up a radio having a processor; on powering up the radio, the processor retrieving and installing an initial set of state variables having a highest statistical probability of providing best performance according to stored statistical weighting of the state variables; receiving a real time communication signal at a radio receiver; measuring at least one performance value associated with the radio receiver with an installed set of state variables; at the processor: iteratively changing at least one of the state variables within a prescribed range in order to identify an improved value of the at least one state variable that provides an improvement to the at least one performance value; storing the improved value of the at least one state variable; applying a statistical weighting to the improved value and storing the statistical weighting; adjusting the prescribed range of the at least one state variable based upon the statistical weighting to provide a revised prescribed range that is statistically likely to contain at least one state variable that provides improvement in the at least one performance value; and storing environment data that characterizes the radio environment along with the improved value of the at least one state variable; the radio sending the improved value and the environment data to a base station; and at the base station pushing the improved value of the at least one state variable to a different radio receiver that is within the environment of the radio.

In certain implementations, the environment data comprises location data and the environment comprises a geographic area. In certain implementations, applying the statistical weighting comprises incrementing a value associated with the improved value of the at least one state variable.

A radio apparatus consistent with the present discussion has a radio receiver configured to receive a real time communication signal. A processor forming a part of the radio receiver is programmed to: measure at least one performance value associated with the radio receiver with an installed set of state variables; iteratively change at least one of the state variables within a prescribed range in order to identify an improved value of the at least one state variable that provides an improvement to the at least one performance value; store the improved value of the at least one state variable; apply a statistical weighting to the improved value; store the statistical weighting; and adjust the prescribed range of the at least one state variable based upon the statistical weighting to provide a revised prescribed range that is statistically likely to contain at least one state variable that provides improvement in the at least one performance value.

In certain implementations, the processor is further programmed to send the improved value to a base station. In certain implementations, the processor is further programmed to receive state variables pushed from the base station. In certain implementations, a base station is configured to push the improved value of the at least one state variable to a different radio receiver. In certain implementations, the processor is further programmed to: store environment data that characterizes the radio environment along with the improved value of the at least one state variable; send the improved value and the environment data that characterizes the environment of the radio to a base station so that the base station can push the improved value of the at least one state variable to a different radio receiver that is within the environment of the radio. In certain implementations, the base station is configured to push the improved value of the at least one state variable to a different radio receiver. In certain implementations, the base station is configured to push a value of the at least one state variable to a different radio receiver and where the base station is configured to determine that the value of the at least one state variable is statistically likely to provide improved performance in at least one performance value within the environment. In certain implementations, the environment data comprises location data and the environment comprises a geographic area. In certain implementations, in being programmed to apply the statistical weighting the processor is programmed to increment a value associated with the improved value of the at least one state variable. In certain implementations, the processor is further programmed to initially install a set of state variables having highest statistical probability of providing the best performance according to the stored statistical weighting upon powering up of the radio receiver.

FIG. 1 is an illustration of an example portion of a communication network in accordance with aspects of the present disclosure. In this example a first radio device 104 can communicate with other devices through a base station transceiver that may be coupled via wired or wireless connection to other base stations, as for example in the cellular telephone and data infrastructure. Data or voice signals from radio 104 are transmitted to the antenna tower 112 which is then passed to the base station 108. The base station transceiver 108 operates under control of a central site controller 116.

As illustrated in FIG. 1, in the particular geographic location (e.g., as determined by global positioning system (GPS) circuitry within the radio device 104), the particular geographic location of this device 104 is known. In this example, an interference source 120 is depicted which may, for example, be a local radio or television transmitter or other device that generates interfering energy in the communication band of the radio 104. In this example, the radio 104 carries out a process of optimization of certain radio parameters in the presence of the interfering energy by optimizing certain state variables. In one simple example, assume that the radio 104 has a filter that can be optimized to reduce the effect of the interfering signal. Hence, the state variables associated with that filter can be transmitted to the base station 108. The base station 108 passes these state variables along to the central site controller 116, upon receipt of the state variables from radio 104. Central site controller 116 then stores the state variables along with location information for radio 104 in a SWS database 126.

When another radio such as 130 enters a location close to that of 104 (as determined by GPS information), the base station 108 recognizes that the radio 130 could benefit from utilizing the state variables associated with that location. Hence, the base station retrieves the state variables associated with that location and pushes the state variables to radio 130. Radio 130 can then install those state variables for use while situated in this geographic location. This may save the radio 130 from need to optimize in the face of interference source 120, or may provide a set of state variables that allow the radio 130 to more quickly converge to more optimal values. In this example, if the state variables are converted to analog signals to adjust a filter, radio 130 may require slightly different values than radio 120, but the state variables pushed from base station 108 may provide a closer set of state variables for use as a starting point. Those state variables can the be optimized and reported back to the base station 108 and used to produce a weighted value that may provide a more generally applicable set of state variables. Over time, the SWS database can be refined to a best set of weighting values for the particular location.

Figure 2:
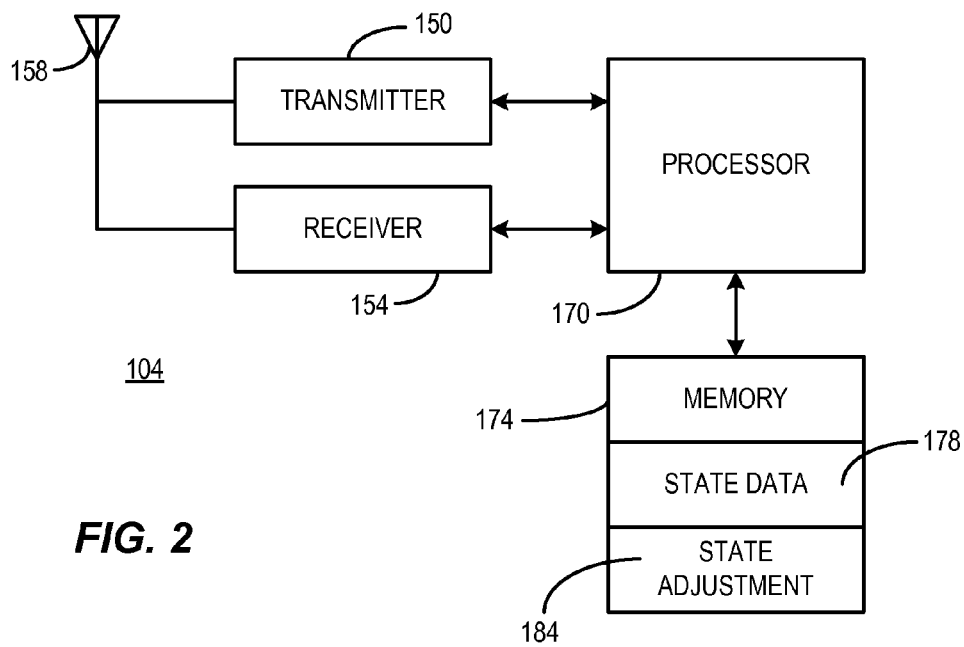
FIG. 2 is an example block diagram of a radio transceiver consistent with certain implementations.

FIG. 2 is a block diagram of an example functional representation of the electronic device 104, for example. This block diagram is simplified for clarity. In this example, radio 104 has a transmitter 150 and a receiver 154 that are operatively coupled to an antenna 158 for transmission and reception. Transmitter 150 and receiver 154 are controlled by one or more processors 170 that control operation of the radio and selection of the various state variables used to define operation of the various circuit elements making up transmitter 150 and receiver 154. Processor 170 utilizes memory 174 of any suitable type that stores state variable data 178 including statistical weighting data as well as various sets of instructions for control of the transceiver. One example set of instructions 184 implements functions that adjust the state variables used by the radio in the manner discussed herein.

Figure 3A:
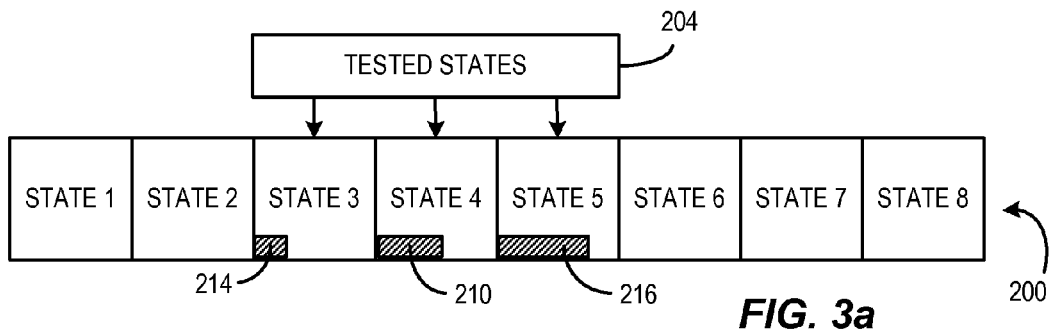
FIG. 3, which is made up of FIG. 3a, FIG. 3b and FIG. 3c, depicts an example process of adjusting a radio parameter by trying out a predefined subset of state values.

A technique for adjustment of certain states is depicted by way of an example in FIG. 3 starting at FIG. 3a. In this illustration, it is assumed that a particular state variable (e.g., a filter bandwidth, amplifier gain, etc.) controls a parameter of the radio that can be associated with a performance parameter (e.g., radio sensitivity, SNR, bit error rate, etc.). In some examples, a particular state variable may only take on two states (e.g., on or off for some feature), but the present state variable as depicted can take on eight states STATE-1 through STATE-8 as shown as 200. Now assume that the factory setting for this state is STATE-4. In this example, which can be implemented using many variations, three states are tested during a process consistent with the present teachings. These three states define a window designated by the test states 204 which identify a current state (STATE-4) and a state on either side of STATE 4 (STATE-3 and STATE-5). It is presumed for this example that the states are in a logical order of increasing or decreasing value.

During this adjustment process STATE-4 is already selected, so the performance parameter(s) associated with this state variable is measured. The result is shown abstractly for illustrative purposes as a bar graph 210 associated with the current performance of the radio using STATE-4, and it will be presumed that a longer bar graph is indicative of better performance. Once this measurement is complete, the process proceeds by selection of an adjacent state such as bar 214 and measurement of performance of the radio using this STATE-3 is carried out. This results in a slightly lower level of performance indicated by the shorter bar 214. Finally, in this example, adjacent STATE-5 is selected and the resulting measurement is represented by bar 216.

In accord with this testing, STATE-5 is selected for use since it has the best performance of those tested in the current environment. In addition, statistics are logged to memory in any suitable manner to indicate that on this particular sequence of tests, STATE-5 has the best performance. This can be done by simply incrementing a counter associated with STATE-5 or by updating statistics associated with each state tested. For example, if simple counters are used, they can be incremented by 0 for STATE-3, 1 for STATE-4 and 2 for STATE-5. Any other suitable way to track the weighted statistics for the state variables can be used without departing from examples consistent with the present teachings.

Figure 3B:
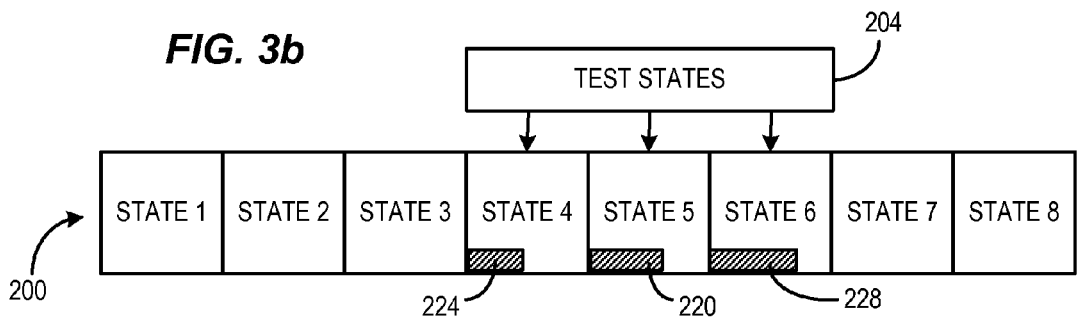

At regular or random intervals or when triggered by a suitable event (e.g., detecting that the radio is in a location where it has never been), this process can be repeated as depicted in FIG. 3b. In this case, after a time interval STATE-5 is still in use but due to varying circumstances (temperature, location, etc.) this state may no longer provide optimum performance. In this iteration of the process, the test states will be incremented so that they surround the most recently known best state, i.e., STATE-5. Otherwise, the process is repeated so that STATE-5 produces a measured result represented by bar 220. The states are then changed to test surrounding states (in this example, one on each side of the current state, but more states or all states could also be tested). So, STATE-4 is tested with results shown by bar 224 and STATE-5 is tested with results shown by bar 228. Once these tests are complete, it is evident that the best state tested is STATE-6 as indicated by the longest bar length 228 so that is set for the radio to utilize until the next test and the statistics are updated and stored in memory.

In this set of tests, the subset of tested states migrates toward the direction that the last set of tests indicate to be producing improvement. Thus, while the first set of tests discussed above tested STATE-3, STATE-4 and STATE-5, this set of tests incremented toward the direction that the prior test indicated might produce improvement. So, this set of tests tested STATE-4, STATE-5 and STATE-6. Since moving to higher numbered states appears to continue to bring improved performance, the next test will test sequentially higher states in this example.

Figure 3C:
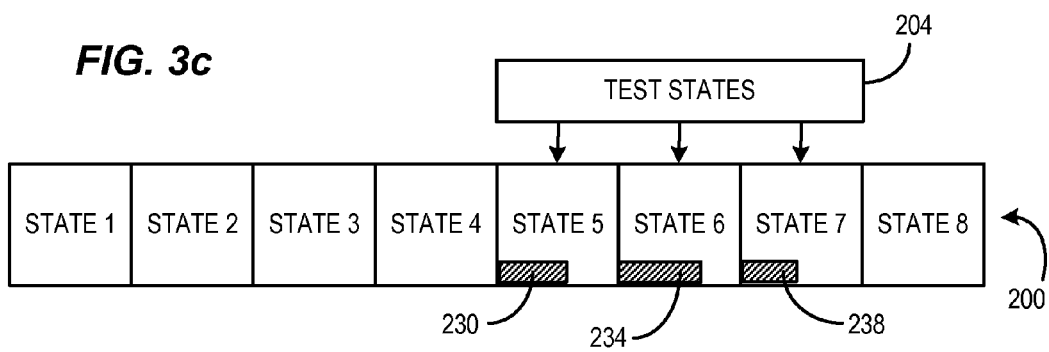

Referring now to FIG. 3c, at regular or random intervals, this process is again repeated using STATE-5, STATE-6 and STATE-7. The same process described above is then repeated to test the test states and as indicated by the performance bars 230, 234 and 238, STATE-6 remains the state resulting in best performance. Hence, the state statistics are updated and the STATE-6 remains the state used for operation of the radio at least until next test (which will again test STATE-5, STATE-6 and STATE-7 since these states surround the currently best state).

Whenever the radio is reset or rebooted, etc. the radio can either sequentially test each state, return to the most recently used state or use the state that exhibits the best statistics in terms of the measured performance (that is, the state that is most likely to produce good results). Additionally, the radio may adjust to a state that exhibits the statistically best performance during long periods of inactivity and the testing may be carried out based upon any logical trigger (e.g., discovery by the radio that it is located in new location). Thus, rather than being set at a state that is artificially obtained in ideal factory conditions, the radio is able to discover what works best most of the time and adjust itself accordingly to provide enhanced performance.

In the example provided above, three states of eight were tested, but five states could have equally well have been tested, for example and a particular state variable may have many more or as few as two states. In other embodiments, all states can be tested each time and the overall statistics or most recent test used to dictate the default state. Many variations will occur to those skilled in the art upon consideration of the present teachings.

It is noted that the above example presumed a one dimensional state variable with eight possible states. However, a state variable can be single dimensional, two dimensional or multi-dimensional in nature. But, the process can work in a similar manner.

Figure 4A:
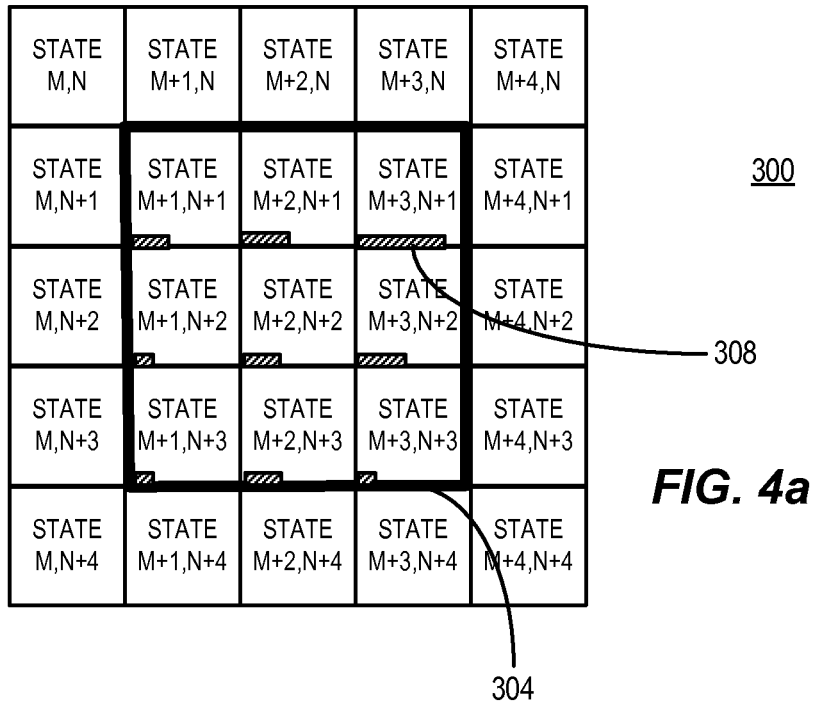
FIG. 4, which is made up of FIG. 4a and FIG. 4b, depicts an example of a two dimensional set of state variables which are tested in a manner consistent with the present teachings.
Figure 4B:
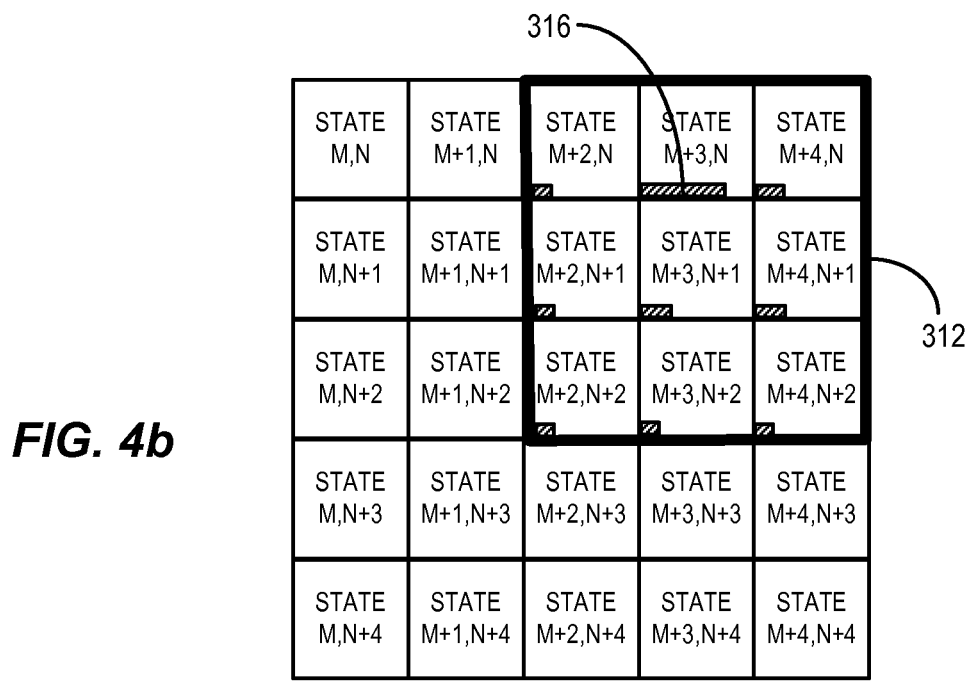

Referring now to FIG. 4 starting with FIG. 4a, a set of two dimensional states 300 is depicted in a manner similar to that of the first example. Note, however, that the figure depicts a set of states that may be a subset of a much larger set of states. Hence, these states are numbered as STATE-M,N through STATE-M+4,N+4. It will be understood that multiple states can extend in all directions and the set of states 300 may be a subset of additional states. In this example, the central set of nine states shown inside the box 304 are the states tested. Each tested state is shown in this visualization to also include a bar graph indicative of the performance obtained when the particular state is tested. Bar graph 308 is intended to be longest indicative that STATE-M+3,N+1 produced the best results when the nine states were tested in the current test. Since this state is at the upper right corner of the box 304, it can be readily concluded based upon the prior discussion that the next set of test states should migrate toward the upper right as depicted in FIG. 4b so as to centralize the best state from the last test within test box 304. When the next set of tests is conducted, the tests are conducted using the states shown in test box 312 of FIG. 4b as shown. This set of tests results in selection of STATE-M+3,N by virtue of bar 316 indicating best performance of this state. In each case, after testing the statistics associated with performance of each tested state is updated so as to create a statistically weighted set of state variables that can be used to aid in selection of the states that are most likely to provide best performance of the radio most often.

Figure 5:
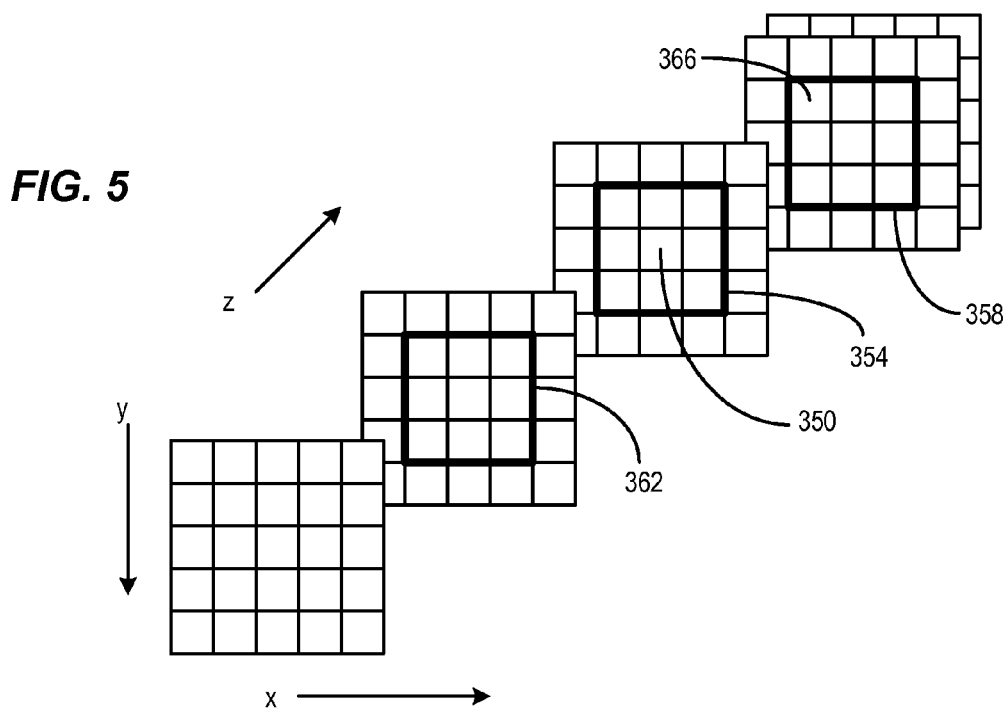
FIG. 5 illustrates a three dimensional set of state variables to demonstrate how the present process can be extended in multiple dimensions.

FIG. 5 illustrates a three dimensional set of state variables to demonstrate how the present process can be extended in multiple dimensions. In this example, three state variables are abstractly labelled x, y and z which may be any set of three state variables that are attributable to a functional aspect of the radio. One example might be a notch filter's Q, bandwidth and center frequency, by way of an illustrative non-limiting example. In this example, each state variable is shown to have five possible values for a total of 125 possible states (which may be a subset of a much larger set of state variables. Initially, if it is assumed that the center-most state 350 is the actively used state, the process could, for example, carry out initial tests of surrounding states in all three dimensions as illustrated by boxes 354, 358 and 362. The test results are then stored in a manner so as to provide a statistical weighting of the performance of the various states and the best performing state variables are selected for use. The test set is then migrated in a manner so as to centralize the best state to the extent possible for the next test set. So, if the best performing state after testing is state 366, the tested states for the next set of tests will move a layer deeper and shift toward the upper left corner of the state variable space shown.

Figure 6:
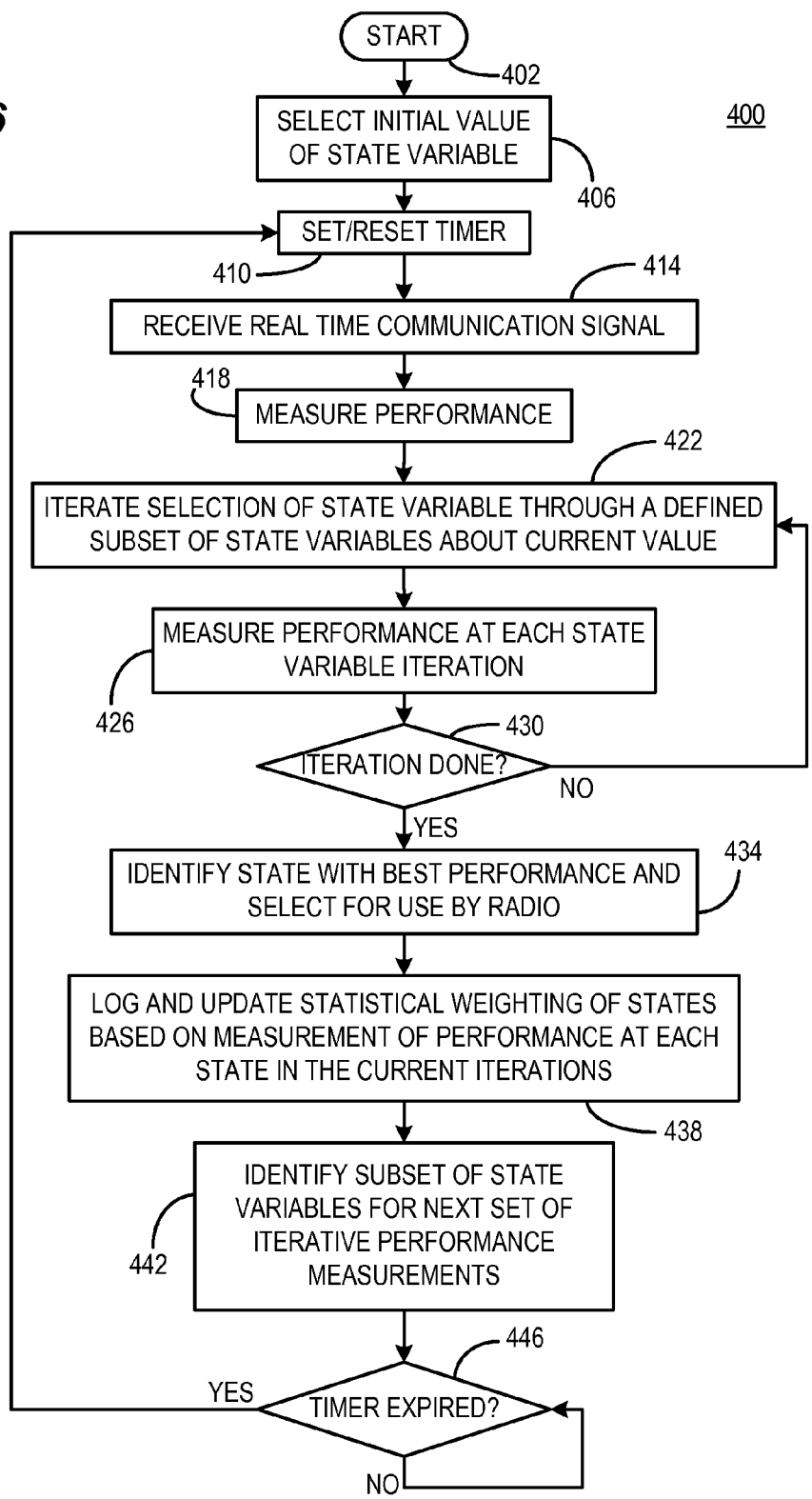
FIG. 6 is an example of a flow chart depicting operation of a process consistent with certain implementations of the present teachings.

An example process 400 that when carried out performs the functions described above can be represented by the flow chart of FIG. 6 starting at 402. In this example, the initial value of a particular state variable of set of state variables is set at an initial value at 406. This initial value may be selected by any number of techniques including, but not limited to: a factory setting, an initialization process involving testing of all of the possible state variables and selecting a state variable or set of state variables which produces a best result, a most recently used state variable or set of state variables, or a state variable or set of state variables established by the present or other process that is pushed from a central site based on experiences of other radios in the geographic area or under similar environmental conditions, or a state variable or set of state variables determined by the present process (or other process) to provide a statistically good chance of performing well. In any case, an initial state variable or set of state variables is selected at 406.

Once the state variable or set of state variables is established and installed for operation of the radio at 406, the process sets a timer at 410 in this example process 400. The present example depends upon a periodic timer to establish a pattern of testing, but in other embodiments, the timer could be a random timer or could be replaced or augmented with other events that trigger a testing (e.g., detection that the radio has entered a location where it has never been), poor performance, etc. Once set, the timer begins counting time until the next set of tests as described below will be carried out.

In these tests, the tests are carried out on real time communications signals under normal operating conditions which are received at 414. This is in contrast to factory adjustment processes in which ideal signals are injected while the circuits are fitted in test jigs that may not recreate a realistic field operating environment. Once the communication signals are received, at 414, a measurement of one or more performance parameters is made at 418 to determine how well the currently selected state variable or set of state variables is performing. This test could involve a measurement of power, SNR, second order distortion, other distortion, current drain, sensitivity, etc. Each such type of measurement generally has a known desirable range or direction in which better performance can be judged. For example, high SNR is considered better than low SNR, low distortion is generally considered better than higher distortion and lower current drain is usually better in a receiver since it translates to better battery life—all other conditions being equal.

So, at 418, some operational parameter or parameters are measured to determine how the presently selected state variable or set of state variables is performing. Then at 422, a new state variable or set of state variables is retrieved from memory for testing. This retrieval involves selecting values that are close to (adjacent) the initial values selected at 406 so that the state variables can be considered to be incremented up or down (eventually in all applicable dimensions for a set of state variables). The performance for the incremented state variable or set of state variables is then measured at 426. The process repeats through 422 and 426 with iteration of the state variables and subsequent testing for each of several nearby state variables (or alternatively for all state variables) until the iteration is deemed completed at 430.

Once the iteration through the state variables and testing and measuring performance is completed, the process examines the results and identifies a state variable or set of state variables at 434 which produce the best performance, or a performance with the best compromise in performance when examining multiple performance parameters, or a performance that is otherwise deemed adequate, is selected for use by the radio. In the case where multiple performance parameters are measured, it is possible that one parameter may improve while another degrades. For example, SNR may improve by increasing current drive to an RF preamplifier, but increased current compromises battery life. So, in this case, if SNR is adequate, the performance may be deemed good enough and good performance means simultaneously minimizing current drain to preserve battery life while having adequate SNR. Conversely, if SNR is marginal, it may be worth compromising some battery life to improve SNR and thereby render communication faster or possible. Those skilled in the art will appreciate that many such compromises may have to be weighed in implementation a determination of what defines best performance for a particular collection of performance parameters.

Once the best performance is selected and loaded into the radio for use, a statistical weighting of the states is logged to memory for the current iteration of the state variables at 438. Any suitable weighting of the states can be utilized including everything from systems in which a single simple counter is incremented for the most desirable state or set of states to systems where a relative performance is more exactly statistically tracked with qualitative measurement of the parameters being tested. Based on the results of the iteration (and possibly upon the overall statistics) a suitable subset of state variables can be selected at 442 for use in the next iteration of the performance measurements as is carried out in 422 and 426. The process then proceeds to 446 at which point the timer is monitored until it expires at which time control passes to 410 where the overall process is repeated to continually update the selection of state variables.

It will be noted that certain state variables may be quite static while others may be quite dynamic. Hence, multiple processes such as 400 may be carried out for differing performance parameters and state variables throughout the radio.

Figure 7:
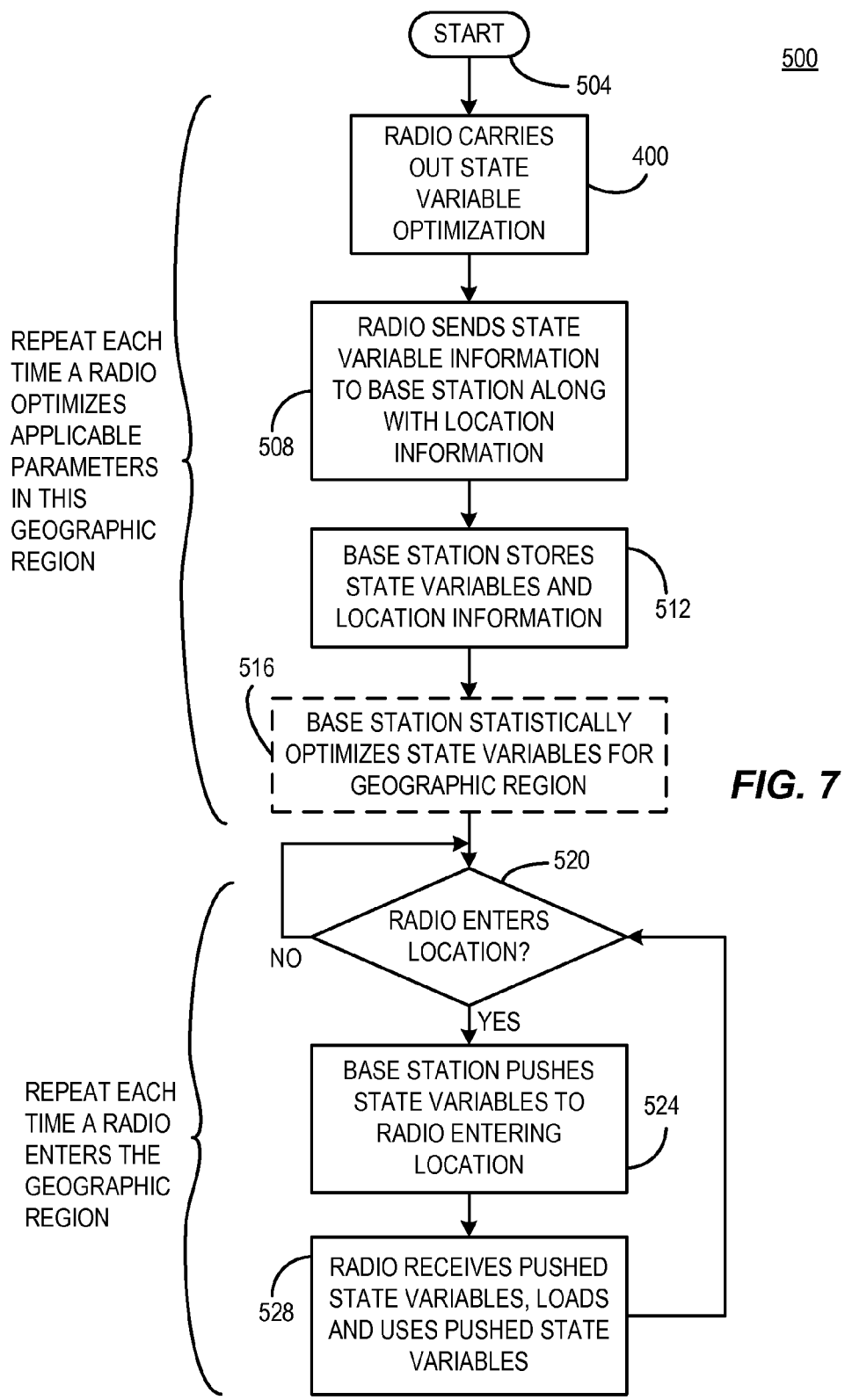
FIG. 7 is an example of a flow chart depicting operation of another process consistent with certain implementations of the present teachings.

As noted earlier, in certain cases, it may be possible for other radios to utilize the measurements and state variable optimization process discussed above. FIG. 7 depicts one example method for implementing this process 500 starting at 504. When a radio carries out a state variable optimization process for certain state variables, such variables may be selected to minimize a type of environmental interference, for example. In such case, the state variables ascertained in the optimization process may be useful to other radios about to enter the environment. So, when the process such as 400 is carried out, the optimized variables for a particular environment along with location coordinates for the radio may be sent to the closest base station at 508 as shown and previously discussed in connection with FIG. 1. The base station then can store the state variables and location information at 512. Additionally and optionally, the base station can collect such data and carry out statistical analysis of the data to determine what geographic area the state variables are applicable to and to further optimize the variables for best performance of multiple radios (with their individual variables factored in) at 516. The base station then awaits entry of another radio into the general geographic region at 520 and when one is discovered, the base station pushes the state variables as data using any suitable data pushing technique (e.g., using BlackBerry® push technology) to the radio that has just entered to geographic region. The radio, upon receipt of the state variables, installs and uses the pushed state variables, but may do its own optimization (e.g., such as 400) to further optimize the state variables.

The process thus described between 400 and 516 can be carried out any time a radio optimizes its state variables within a given geographic region. Similarly, the process between 520 and 528 can be repeated for each radio entering the geographic region of interest. Such region can be manually predefined, can be associated with a cell, determined by identification of locations using similar sets of state variables or using any other technique without limitation.

By way of example, and not limitation, the present teachings can be applied to a radio system in order to correct for asymmetry in the I and Q signals. In such a system, state variables (gain and phase shift) are those used to correct for the I-Q asymmetry and the above techniques can be applied to these state variables in the manner discussed in co-pending application Ser. No. 13/832,432, filed Mar. 15, 2013, which is hereby incorporated by reference.

In this co-pending application, there is provided a method in which a radio receiver having first and second mixers that mix a received communication signal to produce quadrature I and Q signals, measuring an output value of the I and Q signals, a programmed processor is configured to carry out: evaluating symmetry in the I and Q signals by calculating a symmetry test value; iteratively testing gain and phase shift correction values by applying the gain and phase shift values to the I and Q signals to identify a gain and phase shift value that produces an improved symmetry test value; selecting a gain and phase shift value for reduced amplitude and phase error in the output I and Q signals; and applying the gain and phase shift correction to the I and Q signals from the first and second mixers.

Several symmetry tests can be used. In certain implementations, the symmetry test value is equal to or proportional to:

$$\text{Symmetry\_test\_value} = \frac{\text{abs}(\langle II \rangle - \langle QQ \rangle) + \text{abs}(\langle IQ \rangle)}{(\langle II \rangle + \langle QQ \rangle)},$$

where < > means average values. In certain implementations, the symmetry test value is equal to or proportional to: Symmetry_test_value=$\langle I \rangle^2$-$\langle Q \rangle^2$, where < > means average values. In certain implementations, the symmetry test value is equal to or proportional to: Symmetry_phase=$\langle I^*Q \rangle$ where < > means average values. In certain implementations, the gain and phase shift values are stored state variables that are tested to identify selected gain and phase shift values. In certain implementations, the gain and phase shift values are applied to signals from the first and second mixers by processing with a matrix multiplication with the gain and phase shift errors.

By way of another non-limiting example, second order distortion can be addressed using the present techniques in the manner detailed in U.S. patent application Ser. No. 13/832,253, filed Mar. 15, 2013 which is hereby incorporated by reference. Since second order distortion is closely associated with energy present in a frequency band just outside the receive bandwidth B (e.g., between B and 2B), a measure of the energy in this band can be correlated with the IIP2 distortion. The state variables involved are those associated with the IIP2 distortion such as mixer bias or filter parameters. In such an example, a radio receiver uses a method of reducing second order distortion components, involving at a first mixer, mixing an input signal with an oscillator signal to generate an I component of a received radio signal; at a second mixer, mixing the input signal with a phase shifted oscillator signal to generate a Q component of the received radio signal; where the I and Q components of the received signal have a receive bandwidth; computing an estimate of second order distortion as a power output of the I and Q components between the receive bandwidth and twice the receive bandwidth of the received radio signals; and adjusting an operational parameter of the radio receiver to reduce the estimated value of second order distortion components.

In certain implementations, the operational parameter of the radio receiver comprises an operational parameter of one or both of the first and second mixers. In certain implementations, the operational parameter of the radio receiver comprises bias levels of one or both of the first and second mixers. In certain implementations, the bias level comprises a gate bias voltage of one or both of the first and second mixers. In certain implementations, the bias level comprises a bulk bias voltage of one or both of the first and second mixers. In certain implementations, the operational parameter of the radio receiver is an operational parameter of a filter. In certain implementations, the operational parameter of the filter is a filter Q or bandwidth. In certain implementations, the operational parameter of the filter is a notch frequency.

In a final illustrative example, IIP2 distortion can also be estimated directly from the I and Q signals in a manner such as is disclosed in U.S. patent application Ser. No. 13/832,313, filed Mar. 15, 2013 which is hereby incorporated by reference. In such a radio receiver, a method of reducing second order distortion components involves at a first mixer, mixing an input signal with an oscillator signal to generate an I component of a received radio signal; at a second mixer, mixing the input signal with a phase shifted oscillator signal to generate a Q component of the received radio signal; computing an estimate of second order distortion as a function of the I and Q components of the received audio signals; and adjusting an operational parameter of the radio receiver to reduce the estimated value of second order distortion components.

In certain implementations, the estimate of second order distortion is computed as $\langle I^2 \rangle$-$\langle Q^2 \rangle$. In certain implementations, the estimate of second order distortion is computed as $\langle IQ \rangle$. In certain implementations, the operational parameter of the radio receiver comprises an operational parameter of one or both of the first and second mixers. In certain implementations, the operational parameter of the radio receiver comprises bias levels of one or both of the first and second mixers. In certain implementations, the bias level comprises a gate bias voltage of one or both of the first and second mixers. In certain implementations, the operational parameter of the radio receiver comprises an operational parameter of a filter. In certain implementations, the operational parameter of the filter comprises a filter Q or bandwidth.

The order in which the optional operations represented in process 400 may occur may vary in any operational manner without deviating from the present teachings.

The implementations of the present disclosure described above are intended to be examples only. Those of skill in the art can effect alterations, modifications and variations to the particular example embodiments herein without departing from the intended scope of the present disclosure. Moreover, selected features from one or more of the above-described example embodiments can be combined to create alternative example embodiments not explicitly described herein.

It will be appreciated that any module or component disclosed herein that executes instructions may include or otherwise have access to non-transitory and tangible computer readable media such as storage media, computer storage media, or data storage devices (removable or non-removable) such as, for example, magnetic disks, optical disks, or tape data storage, where the term "non-transitory" is intended only to exclude propagating waves and signals and does not exclude volatile memory or memory that can be rewritten. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the server, any component of or related to the network, backend, etc., or accessible or connectable thereto. Any application or module herein described may be implemented using computer readable/executable instructions that may be stored or otherwise held by such computer readable media.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A method, comprising:
   powering up a radio having a processor;
   on powering up the radio, the processor retrieving and installing an initial set of state variables having a highest statistical probability of providing best performance according to stored statistical weighting of the state variables;
   receiving a real time communication signal at a radio receiver;
   measuring at least one performance value associated with the radio receiver with an installed set of state variables;
   at the processor:
      iteratively changing at least one of the state variables within a prescribed range in order to identify an improved value of the at least one state variable that provides an improvement to the at least one performance value;
      storing the improved value of the at least one state variable;
      applying a statistical weighting to the improved value and storing the statistical weighting;
      adjusting the prescribed range of the at least one state variable based upon the statistical weighting to provide a revised prescribed range that is statistically likely to contain at least one state variable that provides improvement in the at least one performance value; and
      storing environment data that characterizes the radio environment along with the improved value of the at least one state variable;
   the radio sending the improved value and the environment data to a base station; and
   at the base station pushing the improved value of the at least one state variable to a different radio receiver that is within the environment of the radio.

2. The method according to claim 1, where the environment data comprises location data and the environment comprises a geographic area.

3. The method according to claim 1, where applying the statistical weighting comprises incrementing a value associated with the improved value of the at least one state variable.

4. A radio apparatus, comprising:
   a radio receiver configured to receive a real time communication signal; and
   a processor forming a part of the radio receiver, the processor being programmed to:
      measure at least one performance value associated with the radio receiver with an installed set of state variables;
      iteratively change at least one of the state variables within a prescribed range in order to identify an improved value of the at least one state variable that provides an improvement to the at least one performance value;
      store the improved value of the at least one state variable;
      apply a statistical weighting to the improved value;
      store the statistical weighting;
      adjust the prescribed range of the at least one state variable based upon the statistical weighting to provide a revised prescribed range that is statistically likely to contain at least one state variable that provides improvement in the at least one performance value;
   where the processor is further programmed to send the improved value to a base station, the base station configured to push the improved value of the at least one state variable to a different radio receiver.

* * * * *